(12) United States Patent
Utter et al.

(10) Patent No.: US 9,669,801 B2
(45) Date of Patent: Jun. 6, 2017

(54) SYSTEMS AND METHODS FOR DETECTING WHEEL ASSEMBLY TAMPERING

(71) Applicant: GM GLOBAL TECHNOLOGY OPERATIONS LLC, Detroit, MI (US)

(72) Inventors: Thomas E. Utter, Royal Oak, MI (US); Douglas M. Kidd, Swartz Creek, MI (US); David T. Proefke, Troy, MI (US); William A. Biondo, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 14/487,411

(22) Filed: Sep. 16, 2014

(65) Prior Publication Data
US 2016/0075306 A1 Mar. 17, 2016

(51) Int. Cl.
*B60R 25/10* (2013.01)
*B60C 23/04* (2006.01)

(52) U.S. Cl.
CPC ...... *B60R 25/1001* (2013.01); *B60C 23/0408* (2013.01)

(58) Field of Classification Search
CPC .............................. B60R 1/00; B60C 2200/00
See application file for complete search history.

(56) References Cited

U.S. PATENT DOCUMENTS

| | | | |
|---|---|---|---|
| 2007/0103278 A1* | 5/2007 | Kawata | B60R 25/1004 340/429 |
| 2009/0021363 A1* | 1/2009 | Heise | B60C 23/0416 340/447 |
| 2014/0070936 A1* | 3/2014 | Schwab | B60C 23/0457 340/447 |

\* cited by examiner

*Primary Examiner* — Shirley Lu
(74) *Attorney, Agent, or Firm* — Lorenz & Kopf, LLP

(57) ABSTRACT

A vehicle includes two or more wheel assemblies, each having a wheel assembly sensor. Each of the wheel assembly sensors is configured to produce acceleration data and pressure data associated with its associated wheel assembly. A wheel assembly tampering module communicatively coupled to the plurality of wheel assembly sensors is configured to produce an output indicative of wheel assembly tampering based on at the acceleration data and the pressure data. Inclination data and signal strength data (associated with each of the wheel assembly sensors) may also be used to determine wheel assembly tampering.

20 Claims, 3 Drawing Sheets

SYSTEMS AND METHODS FOR DETECTING WHEEL ASSEMBLY TAMPERING

TECHNICAL FIELD

The technical field generally relates to automotive vehicles, and more particularly relates to systems and methods for detecting wheel assembly tampering using multiple sensor types.

BACKGROUND

Recent years have seen a dramatic increase in vehicle wheel thefts. While traditional vehicle alarm systems are typically capable of sensing some forms of wheel assembly tampering (e.g., through the use of an inclination sensor that detects large-scale changes in the orientation of the vehicle), and most modern vehicles include tire pressure monitoring (TPM) sensors that sense, after the fact, that one or more tires have lost inflation, currently known vehicles provide very little protection against the theft and tampering of wheel assemblies. Furthermore, inclination sensors may, in many circumstances, produce false-positive alarms.

Accordingly, it is desirable to provide improved systems and methods for detecting wheel assembly tampering in automotive vehicles. Additional desirable features and characteristics of the present invention will become apparent from the subsequent detailed description and the appended claims, taken in conjunction with the accompanying drawings and the foregoing technical field and background.

SUMMARY

In accordance with one embodiment, a method for determining tampering of a wheel assembly of a vehicle having a plurality of wheel assemblies in includes receiving acceleration data associated with the movement of the plurality of wheel assemblies; receiving pressure data associated with the pressure of the plurality of wheel assemblies; receiving inclination data associated with an inclination angle of the vehicle; determining signal strength data associated with a plurality of transmitters, each associated with a respective wheel assembly sensor; and producing an output indicative of wheel assembly tampering based on the acceleration data, the pressure data, the signal strength data, and the inclination data.

A vehicle in accordance with one embodiment includes a plurality of wheel assembly sensors, each associated with a respective wheel assembly of the plurality of wheel assemblies, wherein each of the wheel assembly sensors is configured to produce acceleration data and pressure data associated with its associated wheel assembly. The vehicle further includes a wheel assembly tampering module communicatively coupled to the plurality of wheel assembly sensors, the wheel assembly tampering module configured to produce an output indicative of wheel assembly tampering based on at least the acceleration data and the pressure data.

DESCRIPTION OF THE DRAWINGS

The exemplary embodiments will hereinafter be described in conjunction with the following drawing figures, wherein like numerals denote like elements, and wherein.

DETAILED DESCRIPTION

The subject matter described herein generally relates to systems and methods for detecting, in real time, wheel assembly theft and/or tampering using a variety of sensor data available within the vehicle, such as tire pressure monitoring (TPM) sensors, multi-axis accelerometers provided within each wheel assembly, vehicle inclination sensors, and receivers configured to determine the received signal strength (RSSI) associated with each of the wheel assembly sensors. In this way, by the use of multiple types of signal data, a reliable tamper detection system may be provided. In that regard, the following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
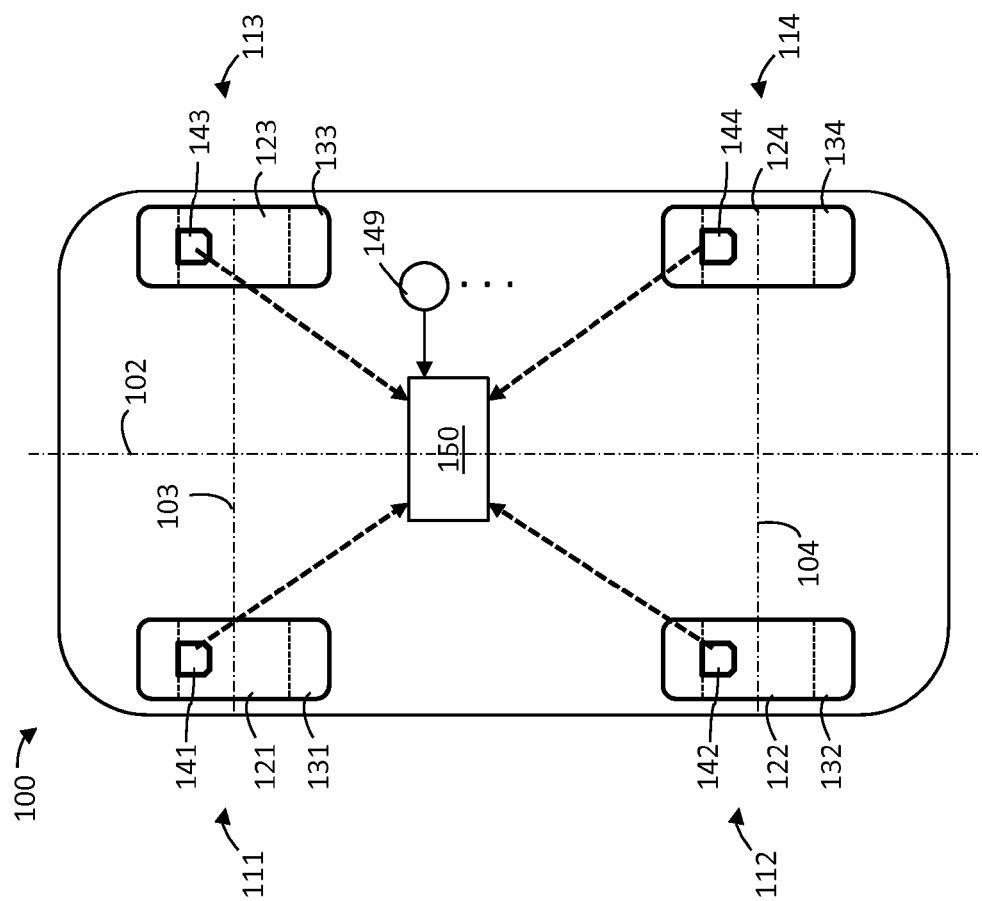
FIG. 1 is a conceptual overview of a vehicle including a wheel assembly tampering system in accordance with an exemplary embodiment.

Referring now to the conceptual block diagram of FIG. 1, a vehicle 100 in accordance with various exemplary embodiments includes a plurality of wheel assemblies 111-114, each having an associated wheel (e.g., wheels 121-124), tire (e.g., tires 131-134), and wheel assembly sensor (e.g., wheel assembly sensors 141-144). Vehicle 100 may also include a vehicle inclination sensor 149, as is known in the art, configured to determine the inclination and change in inclination of vehicle 100 (e.g., due to being lifted slightly at one end). In the interest of brevity, the wheel assembly sensors 141-144 may be referred to herein as simply "sensors," even though, as will be described below, each may typically include multiple individual sensor devices. Note that while four wheel assembly sensors 141-144 are illustrated, the invention is not so limited. Vehicle 100 may include two, three, or any number of wheel assembly sensors depending upon the nature of vehicle 100.

In various embodiments, each wheel assembly sensor 141-144 is configured to produce sensor data of various types useful in determining that wheel assembly tampering is taking place. In one embodiment, for example, each wheel assembly sensor 141-144 is configured to produce acceleration data and pressure data associated with its associated wheel assembly. In a preferred embodiment, the acceleration data produced by each wheel assembly sensor 141-144 is multi-axis data—i.e., data that characterizes the movement of wheel assemblies 111-114 along the longitudinal axis 102 of vehicle 100, the movement of wheel assemblies 111-114 axially (e.g., parallel to axis 103 for wheel assemblies 111 and 113, and parallel to axis 104 for wheel assemblies 112 and 114), and rotational movement (e.g., radial and/or tangential acceleration while rolling).

Figure 2:
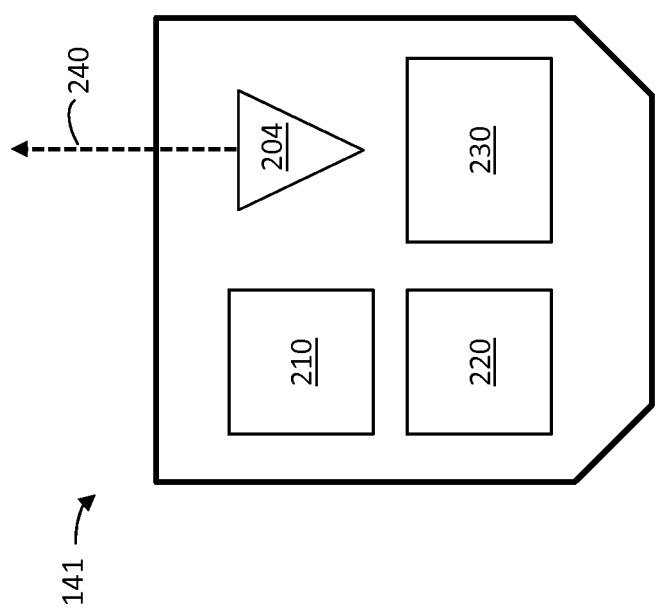
FIG. 2 is a conceptual block diagram of a wheel assembly sensor module in accordance with one embodiment.

Referring briefly to FIG. 2, an exemplary wheel assembly sensor 141 includes a multi-axis accelerometer 210 (e.g., a MEMS-based solid-state accelerometer), a pressure sensor 220 (e.g., a traditional direct TPM sensor as is known in the art), a power source 230 (e.g., a battery and/or energy-harvesting component), and a transmitter 204 (e.g., a conventional RF transmitter) configured to produce signal 240, which includes the relevant sensor data (suitably encoded, e.g., as in conventional TPM sensors) produced by wheel assembly sensor 141. In this regard, signal 240 may encode the sensor data in accordance with any suit. In some embodiments, components 210, 220, 204, and 230 are integrated into a single unit—e.g., a TPM sensor with the addition of multi-axis accelerometer 210. In other embodiments, the various components are housed separately. The nature and operation of conventional multi-axis accelerometers, pressure sensors, and RF transmitters are well known in the art, and need not be described in detail herein.

Referring again to FIG. 1, vehicle 100 also includes a wheel assembly tampering module (or simply "module" 150) communicatively coupled (e.g., via conventional RF connections known in the art) to the plurality of wheel assembly sensors 141-144. It will be appreciated that FIG. 1 is a simplified view of a direct TPM system, as such systems may also include intervening communication devices, such as "initiator" modules (not illustrated) that actually receive the transmissions from sensors 141-144, and then forward them through a data bus to module 150.

Figure 3:
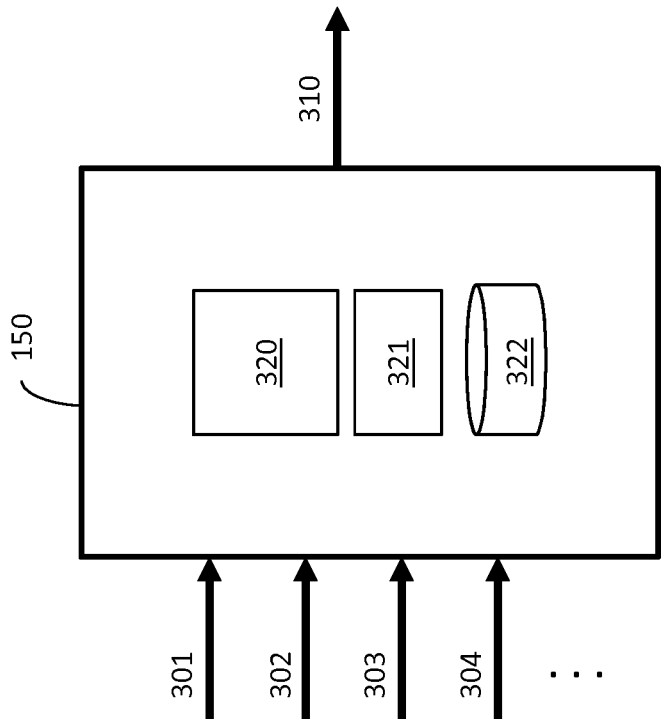
FIG. 3 is a conceptual block diagram of a wheel assembly tampering module in accordance with one embodiment.

In general, module 150 includes any suitable combination of hardware and/or software configured to produce an output indicative of wheel assembly tampering (e.g., an audio alarm integrated into vehicle 100 and/or remote from vehicle 100) based on available data—e.g., inclination data (from inclination sensor 149), accelerometer data and pressure data (from wheel assembly sensors 141-144), and signal strength data (e.g., received signal strength (RSS) data associated with signal 240 of FIG. 2). In particular, referring briefly to the conceptual diagram of FIG. 3, module 150 accepts a variety of sensor data 301, 302, 303, 304, etc., and produces an output 310 indicative of wheel assembly tampering. Module 150 may include one or more processors 320, memory 321, and storage 322, wherein storage 322 stores software instructions configured to instruct processor 320 to operate in accordance with the methods described herein. In the illustrated embodiment, as described above, data 301-304 correspond, respectively, to accelerometer data, pressure data, inclination data, and RSSI data. While FIG. 1 depicts pressure data 302 being received directly from each wheel assembly 111-114, the invention is not so limited. Pressure data 302 may also be produced via an "indirect" tire pressure monitor system, such as a system that infers pressure difference based on the relative speed (and computed circumferences) of each of the wheel assemblies 111-114.

It will be understood that module 150 will typically include additional components, which in the interest of simplicity are not illustrated, such as an RF receiver, a power source, and the like. Furthermore, in any particular embodiment, module 150 might be implemented and distributed between multiple automotive control modules that already exist within vehicle 100.

Figure 4:
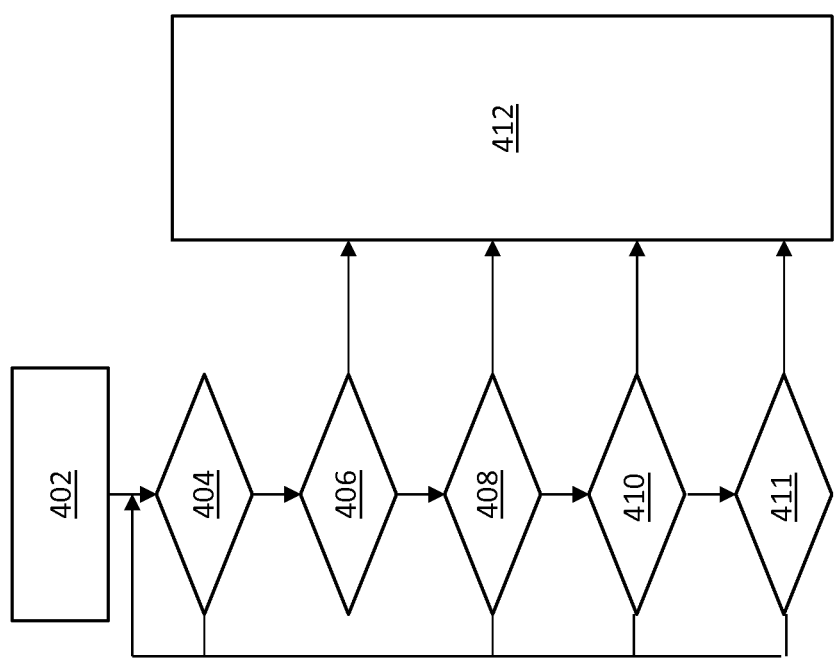
FIG. 4 is a flowchart depicting a method in accordance with one embodiment.

As described above, module 150 is configured to produce an output indicative of wheel assembly tampering based on multiple types of data, thereby producing a more reliable indicator and reducing false positives. While the particular methods used to determine tampering might vary, FIG. 4 presents a flow chart in accordance with one embodiment, and will be described in conjunction with FIGS. 1-3.

Beginning at 402, the relevant wheel assembly tampering alarm system is armed. This may be accomplished manually by a user, or automatically by vehicle 100 itself (e.g., upon vehicle shut-down). Once the system is armed, a determination is made (step 404) as to whether new sensor data (e.g., pressure data, accelerometer data, inclination data, etc.) has been received. If not, the system returns and loops until such new sensor data is received.

If, however, new sensor data has been received at 404, the system continues to step 404, in which the system queries whether the pressure data 302 indicates a simultaneous change in pressure of a plurality of the wheel assemblies above a predetermined threshold. That is, the system might determine that the load-bearing status of the wheels have changed in a manner consistent with vehicle 100 being jacked up slightly along one side. Such a scenario might arise, for example, if the left side of vehicle 100 in FIG. 1 were lifted slightly such that the pressure of tires 131 and 132 are reduced, and the pressure of tires 133 and 134 are increased beyond a predetermined threshold, for example, about 5-35 kPa. In another embodiment, the system might determine that the pressure data 302 is consistent with one tire being deflated quickly (e.g., via the valve stem or sharp object) while the vehicle is substantially stationary. In either case, the system continues to step 412 and produces an output indicative of tampering. This output might include, for example, requesting a vehicle alarm or otherwise notifying a user of such tampering.

Next, in step 408, the system determines, via inclination data 303, whether the inclination angle is greater than a predetermined threshold. This threshold will typically vary depending upon the nature of vehicle 100. In one embodiment, for example, corresponding to a mid-sized automobile, the predetermined threshold is between about 0.3 and 1.0 degrees. If the predetermined threshold is met, then the system continues to step 412 as before.

In step 410, the system determines whether accelerometer data 301 is consistent with one of wheel assemblies 111-114 being moved axially—i.e., parallel to axes 103 or 104 of FIG. 1. That is, this form of non-rolling movement (with no appreciable tangential or radial acceleration) would more likely be attributable to a wheel assembly being removed, rather than normal operation of vehicle 100. If axial movement is detected, the system proceeds to step 411 and attempts to confirm such movement using received strength (RSS) values associated with each of the wheel assemblies 111-114. That is, it might be determined that the RSS value associated with the transmitter (204 in FIG. 2) of wheel assembly 111 has reduced significantly at substantially the same time that the accelerometer data 301 associated with wheel assembly sensor 141 indicates axial movement. The RF data may be configured to be transmitted at multiple field strengths to to facilitate the computation. This also reduces the power of RF transmission to facilitate loss of communication at a shorter distance to the vehicle. If axial movement is confirmed, the process continues to step 412. Otherwise, the process continues back to step 404 as described above.

The output of module 150 may take a variety of forms, including a request for visual, audio, and/or other such alarms. In one embodiment, the alarm is integral to vehicle 10 (e.g., to frighten away the individual tampering with the wheel assembly). In some embodiments, an alarm is generated remotely to notify the user of vehicle 10, e.g., via a key fob or a mobile device (e.g., a smart phone, tablet, or the like).

While FIG. 4 depicts a sequential series of steps for determining wheel assembly tampering, the invention is not so limited, and may be accomplished in a variety of ways. In one embodiment, for example, module 150 implements a machine learning model that is trained to recognize wheel assembly tampering based on data 301-304.

In summary, what have been described above are systems and methods for detecting, in real time, wheel assembly theft and/or tampering using a variety of sensor data available within the vehicle. In this way, by the use of multiple types of signal data, a reliable tamper detection system may be provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle comprising:
    a plurality of wheel assemblies;
    a plurality of wheel assembly sensors, each associated with a respective wheel assembly of the plurality of wheel assemblies, wherein each of the wheel assembly sensors is configured to produce acceleration data and pressure data associated with its associated wheel assembly, the acceleration data characterizing at least axial movement of each of the plurality of wheel assemblies;
    a wheel assembly tampering module, including a processor, communicatively coupled to the plurality of wheel assembly sensors, the wheel assembly tampering module configured to produce an output indicative of wheel assembly tampering based on the acceleration data.

2. The vehicle of claim 1, wherein the wheel assembly tampering module is further configured to produce the output indicative of wheel assembly tampering based on the pressure data.

3. The vehicle of claim 1, wherein the wheel assembly tampering module is configured to produce the output indicative of wheel assembly tampering when the pressure data indicates a simultaneous change in pressure of a plurality of the wheel assemblies above a predetermined threshold.

4. The vehicle of claim 1, wherein the wheel assembly tampering module is configured to produce the output indicative of wheel assembly tampering when the acceleration data indicates substantially non-rolling movement of at least one of the wheel assemblies.

5. The system of claim 1, further including an inclination sensor configured to sense an angle of inclination of the vehicle and produce inclination data associated therewith, wherein the wheel assembly tampering module is further configured to produce the output indicative of wheel assembly tampering based on a change in the inclination data.

6. The system of claim 5, wherein the wheel assembly tampering module is configured to produce the output indicative of wheel assembly tampering if the change in the inclination data is greater than a predetermined threshold.

7. The system of claim 1, wherein the wheel assembly tampering module is configured to produce the output indicative of wheel assembly tampering based in part on whether the accelerometer data indicates movement of at least one of the wheel assemblies.

8. The system of claim 7, wherein each of the plurality of wheel assembly sensors include a transmitter, and the wheel assembly tampering module is configured to confirm the movement of the at least one wheel assembly based on the relative strength of the signal received from the transmitter associated with the least one wheel assembly.

9. A wheel assembly tampering module comprising:
    a processor;
    a storage device communicatively coupled to the processor, the storage device storing computer-readable software instructions configured to instruct the processor to:
    receive acceleration data and pressure data produced by a plurality of wheel assembly sensors coupled to a corresponding plurality of wheel assemblies, the acceleration data characterizing at least axial movement of each of the plurality of wheel assemblies;
    receive inclination data produced by a vehicle inclination sensor;
    determine signal strength data associated with a plurality of transmitters, each associated with a respective wheel assembly sensor; and
    produce an output indicative of wheel assembly tampering based on the acceleration data, the pressure data, the signal strength data, and the inclination data.

10. The module of claim 9, wherein the software is configured to instruct the processor to produce the output indicative of wheel assembly tampering when the acceleration data and the signal strength data indicates substantially non-rolling movement of at least one of the wheel assemblies.

11. The module of claim 10, wherein the wheel assembly tampering module is configured to produce the output indicative of wheel assembly tampering based in part on whether the accelerometer data indicates axial acceleration of at least one of the wheel assemblies.

12. The module of claim 9, wherein the software is configured to instruct the processor to produce the output indicative of wheel assembly tampering when the pressure data indicates a simultaneous change in pressure of a plurality of the wheel assemblies above a predetermined threshold.

13. The module of claim 9, wherein the software is configured to instruct the processor to produce the output indicative of wheel assembly tampering when the pressure data indicates pressure loss above a predetermined threshold at least one of the wheel assemblies while the vehicle is substantially stationary.

14. The module of claim 9, wherein the software is configured to instruct the processor to produce the output indicative of wheel assembly tampering when a change in the inclination data is greater than a predetermined threshold.

15. The module of claim 9, wherein wherein the software is configured to instruct the processor to produce the output indicative of wheel assembly tampering based on the relative strength of the signal received from the transmitter associated with the least one wheel assembly.

16. A method for determining tampering of a wheel assembly of a vehicle having a plurality of wheel assemblies, the method comprising:
    receiving acceleration data associated with the movement of the plurality of wheel assemblies;
    receiving pressure data associated with the pressure of the the plurality of wheel assemblies, the acceleration data characterizing at least axial movement of each of the plurality of wheel assemblies;

receiving inclination data associated with an inclination angle of the vehicle;

determining signal strength data associated with a plurality of transmitters, each associated with a respective wheel assembly sensor; and producing, with a processor, an output indicative of wheel assembly tampering based on the acceleration data, the pressure data, the signal strength data, and the inclination data.

17. The method of claim 16, including produce the output indicative of wheel assembly tampering when the acceleration data and the signal strength data indicates substantially non-rolling movement of at least one of the wheel assemblies.

18. The method of claim 16, including producing the output indicative of wheel assembly tampering when the pressure data indicates a simultaneous change in pressure of a plurality of the wheel assemblies above a predetermined threshold.

19. The method of claim 16, including producing the output indicative of wheel assembly tampering when a change in the inclination angle is greater than a predetermined threshold.

20. The method of claim 16, wherein the output indicative of wheel assembly tampering includes an auditory alarm.

* * * * *